(12) United States Patent
Júlio et al.

(10) Patent No.: US 7,758,240 B2
(45) Date of Patent: Jul. 20, 2010

(54) PN-JUNCTION TEMPERATURE SENSING APPARATUS

(75) Inventors: Alexandre Júlio, Lisbon (PT); Vitor Chatinho, Vila do Conde (PT); António Barny Monteiro, Póvoa de Varzim (PT); André Cardoso, Braga (PT)

(73) Assignee: Infineon Technologies AG, Munich (DE)

( * ) Notice: Subject to any disclaimer, the term of this patent is extended or adjusted under 35 U.S.C. 154(b) by 627 days.

(21) Appl. No.: 11/566,501

(22) Filed: Dec. 4, 2006

(65) Prior Publication Data

US 2007/0158776 A1    Jul. 12, 2007

Related U.S. Application Data

(63) Continuation of application No. PCT/IB2004/001828, filed on Jun. 4, 2004.

(51) Int. Cl.
    *G01K 7/00* (2006.01)
(52) U.S. Cl. .................. 374/178; 374/170; 327/512
(58) Field of Classification Search ........... 374/178, 374/170; 327/512
    See application file for complete search history.

(56) References Cited

U.S. PATENT DOCUMENTS

| | | | | |
|---|---|---|---|---|
| 3,430,077 A | 2/1969 | Bargen | .............. | 307/310 |
| 5,195,827 A | 3/1993 | Audy et al. | .............. | 374/172 |
| 5,713,668 A | 2/1998 | Lunghofer et al. | .......... | 374/179 |
| 5,982,221 A | 11/1999 | Tuthill | .............. | 327/512 |
| 6,008,685 A * | 12/1999 | Kunst | .............. | 327/512 |
| 6,097,239 A * | 8/2000 | Miranda et al. | .............. | 327/512 |
| 6,149,299 A * | 11/2000 | Aslan et al. | .............. | 374/178 |
| 6,157,244 A | 12/2000 | Lee et al. | .............. | 327/539 |
| 6,297,761 B1 | 10/2001 | Barrenscheen et al. | ...... | 341/166 |
| 6,465,784 B1 | 10/2002 | Kimata | .............. | 250/332 |
| 6,554,469 B1 | 4/2003 | Thomson et al. | .............. | 374/178 |
| 6,554,470 B2 | 4/2003 | Zhang et al. | .............. | 374/178 |
| 6,777,682 B2 | 8/2004 | Ishikawa et al. | .............. | 250/338.4 |
| 6,851,849 B2 | 2/2005 | Kimura | .............. | 257/467 |
| 6,962,436 B1 * | 11/2005 | Holloway et al. | .............. | 374/170 |

(Continued)

FOREIGN PATENT DOCUMENTS

JP       2003101880 A    4/2003

(Continued)

OTHER PUBLICATIONS

Taverner et al. "Industrial Measurements with Very Short Immersion" Isothermal Technology Ltd. (6 pages).

(Continued)

*Primary Examiner*—Gail Verbitsky
*Assistant Examiner*—Mirellys Jagan
(74) *Attorney, Agent, or Firm*—Eschweiler & Associates, LLC (57) ABSTRACT

A PN-junction temperature sensing apparatus for applying input signals to a semiconductor device and measuring temperature-dependent output signals has an odd number of current sources (1, 2, n) switches (5, 6, 7) with selectable outputs to connect the current sources (5, 6, 7) with a thermal sensor (12) or a sink diode (13) and an A/D converter (17) to digitize the measured voltage of the thermal sensor (12). A digital processor (18) controls the switches (5, 6, 7) and stores the digitized voltage values in a memory. Provided algorithms allow the usage of these values to provide a calibrated measurement of temperature and also sensor life estimation.

20 Claims, 6 Drawing Sheets

U.S. PATENT DOCUMENTS

| | | | |
|---|---|---|---|
| 7,010,440 B1 * | 3/2006 | Lillis et al. | 702/65 |
| 7,140,767 B2 * | 11/2006 | McLeod et al. | 374/178 |
| 2006/0267668 A1 * | 11/2006 | Porter | 327/512 |
| 2010/0002748 A1 * | 1/2010 | Lin et al. | 374/170 |

FOREIGN PATENT DOCUMENTS

| | | |
|---|---|---|
| JP | 2003106894 A | 4/2003 |
| RU | 2089863 C1 | 9/1997 |
| SU | 1527515 A1 | 12/1989 |
| SU | 1543250 A1 | 2/1990 |
| WO | 00/23776 | 4/2000 |

OTHER PUBLICATIONS

Verster "p-n Junction as an ultra linear calculable thermometer" Electron. Lett., vol. 4., No. 9 (pp. 175-176), May 1998.

"Neuartige Modelle zur kalibrationsfreien Temperaturmessung mit pn-Ubergangen" Fortscgruttsbericht, Reihe 8, Nr. 905 (3 pages), 2001.

Goncalves et al. "A miniaturized self-calibrated pyrometer microsystem" Eurosensors XVII Conference (pp. 568-569), Sep. 23, 2003.

International Search Report and Written Opinion for International Application No. PCT/IB2004/001828 (10 pages), Jun. 4, 2004.

\* cited by examiner

| Step | 1st cycle Current source switches | | | | | | 2nd cycle Current source switches | | | | | | 3rd cycle Current source switches | | | | | |
|---|---|---|---|---|---|---|---|---|---|---|---|---|---|---|---|---|---|---|
| | A | B | C | D | E | F | A | B | C | D | E | F | A | B | C | D | E | F |
| 1st | I | I | I |   | I | I | I | I | I | I |   | I | I | I |   | I | I | I |
| 2nd |   |   |   | I |   |   |   |   |   | I |   |   |   |   |   |   |   | I |
| 3rd | I | I | I | I | I | I | I | I | I | I | I | I | I | I | I | I | I | I |
| 4th |   | I |   | I |   |   |   |   |   | I |   | I | I |   |   |   | I |   |
| 5th | I |   | I | I |   | I | I | I |   | I | I |   |   | I | I |   | I | I |
| 6th |   | I |   | I | I |   |   |   | I | I |   | I | I |   |   | I |   | I |

| Step | 4th cycle | | | | | | 5th cycle | | | | | | 6th cycle | | | | | |
|---|---|---|---|---|---|---|---|---|---|---|---|---|---|---|---|---|---|---|
| 1st |   | I | I | I | I | I |   | I | I | I | I | I | I | I |   |   | I | I |
| 2nd | I |   |   |   |   |   |   |   |   | I |   |   |   | I | I |   |   |   |
| 3rd | I | I | I | I | I | I | I | I | I | I | I | I | I | I | I | I | I | I |
| 4th |   | I |   | I |   |   |   |   | I |   | I |   | I |   |   |   | I |   |
| 5th | I |   | I | I |   | I | I | I |   | I | I |   |   |   | I | I |   | I |
| 6th | I | I |   |   | I |   |   | I | I |   |   | I | I |   |   | I | I |   |

| Step | 1st cycle mirrored | | | | | | 2nd cycle mirrored | | | | | | 3rd cycle mirrored | | | | | |
|---|---|---|---|---|---|---|---|---|---|---|---|---|---|---|---|---|---|---|
| 1st | I | I |   | I | I | I | I |   | I | I | I |   | I | I | I | I | I | I |
| 2nd |   |   | I |   |   |   |   | I |   |   |   |   | I |   |   |   |   |   |
| 3rd | I | I | I | I | I | I | I |   | I | I | I | I | I | I | I | I | I | I |
| 4th |   | I |   | I |   |   | I |   |   | I |   |   |   |   |   | I |   | I |
| 5th | I |   | I | I |   | I | I |   | I |   | I | I | I | I |   |   | I | I |
| 6th |   | I | I |   | I |   |   | I |   |   | I |   | I |   | I |   |   | I |

FIG 5

| Step | 1st cycle (symmetric) Current source switches | | | | | | |
|---|---|---|---|---|---|---|---|
| | A | B | C | D | E | F | G |
| 1st | I | | I | | I | | I |
| 2nd | I | I | | I | | I | I |
| 3rd | | | I | | I | | |
| 4th | I | I | I | I | I | I | I |
| 5th | | | | I | | | |
| 6th | I | I | I | | I | I | I |
| 7th | | I | | I | | I | |

| Step | 2nd cycle | | | | | | | 3rd cycle | | | | | | | 4th cycle | | | | | | |
|---|---|---|---|---|---|---|---|---|---|---|---|---|---|---|---|---|---|---|---|---|---|
| 1st | I | I | | I | | I | | | I | I | | I | | I | I | | I | I | | I | |
| 2nd | I | I | I | | I | | I | I | I | | I | | I | | | I | I | I | I | | I |
| 3rd | | | | I | | I | | | | | | I | | I | I | | | | | | I |
| 4th | I | I | I | I | I | I | I | I | I | I | I | I | I | I | I | I | I | I | I | I | I |
| 5th | | | | | I | | | | | | | | | I | | | | | | | I |
| 6th | I | I | I | I | | I | I | I | I | I | I | | I | I | I | I | I | I | I | I | I |
| 7th | | | I | | I | | I | I | | | I | | I | | I | | I | | I | | I |

| Step | 5th cycle (mirror of the 4th) | | | | | | | 6th cycle (mirror of the 3rd) | | | | | | | 7th cycle (mirror of the 2nd) | | | | | | |
|---|---|---|---|---|---|---|---|---|---|---|---|---|---|---|---|---|---|---|---|---|---|
| 1st | | I | | I | I | | I | I | | I | | I | I | | | I | | I | | I | I |
| 2nd | I | | I | I | I | I | | | I | | I | I | I | | I | | I | | I | I | I |
| 3rd | | I | | | | | I | I | | I | | | | | | I | | I | I | | |
| 4th | I | I | I | I | I | I | I | I | I | I | I | I | I | I | I | I | I | I | I | I | I |
| 5th | I | | | | | | | | | | I | | | | | | | I | | | |
| 6th | | I | I | I | I | I | I | I | | I | I | I | I | I | I | I | | I | I | I | I |
| 7th | I | | I | | | | I | I | | | I | | | I | I | | I | I | | | I |

FIG 6

- Sources (metal)
- Gates (polysilicon)
- Drains (metal)
- Metal over polysilicon
  Only at ref they are
  connected by vias

FIG 7

PN-JUNCTION TEMPERATURE SENSING APPARATUS

CROSS-REFERENCE TO RELATED APPLICATION

This application is a continuation of co-pending International Application No. PCT/IB2004/001828 filed Jun. 4, 2004, which designates the United States.

TECHNICAL FIELD

The invention relates to a PN-junction temperature sensing apparatus with electrical devices, and more particularly to an apparatus for applying input signals to a semiconductor device and measuring temperature-dependent output signals from the device as an indication of temperature.

BACKGROUND

Numerous circuit devices, such as transistors, diodes and resistors, have operating characteristics that are temperature dependent. To accurately test a device to determine whether it is operating within prescribed limits, its temperature during the test procedure should accordingly be known. Because of its temperature dependence the device may itself be used as a temperature sensor, in which case it is especially important to determine whether it is operating accurately.

Since the operating characteristics of various devices are temperature dependent, it is at least conceptually possible to determine the device temperature by exciting an input signal to the device, observing a temperature-dependent output signal, and calculating the temperature from the relationship between the two signals. For example, germanium and silicon diodes have been operated at a constant forward-biased current and the resulting forward-biased voltage has been measured to determine the temperature in accordance with the standard forward-bias diode equation [1]:

$$\Delta V = T \cdot k/q \cdot \ln(I_1/I_0) \quad [1]$$

wherein $I_0$ is a small forward energizing level, $I_1$, is an integer multiple (typically 10) of $I_0$, 'ln' is the natural logarithm function; q is the elementary charge (1.602 176 462(63)× $10^{-19}$ Coulomb); k is the Boltzmann constant (1.380 6503 (24)×$10^{-23}$ J K$^{-1}$); T is the absolute temperature in Kelvin and $\Delta V$ is the voltage difference between $V_1$, and $V_0$, respective responses of $I_1$, and $I_0$ energizing levels.

Conventional devices according to U.S. Pat. No. 6,554,469 of Thomson et al. and U.S. Pat. No. 6,554,470 of Zhang et al. are quite restrictive in the choice of the group of current excitation levels. U.S. Pat. No. 6,554,469 demands an integer ratio between 4 current levels. In U.S. Pat. No. 6,554,470 the current levels are limited to 3 degrees of freedom. Four current level ratios are demanded for the best performance of their methods. Such a need adds complexity in the design of the current conditioner, making their specified ratios more driftable with aging, increase ohmic temperature cycling of the PN-junction sensor and put it in a higher electrical stress that will accelerate aging. At U.S. Pat. No. 6,554,469 one can read "the calculations necessitated by a three-current approach are likely to require non-integer math, which can be difficult and/or impractical to implement". This difficulty will be overcome by the embodiments of this application.

The method disclosed by Thomson et al. in U.S. Pat. No. 6,554,469 is a four-current version of a prior work made within Analog Devices known from U.S. Pat. No. 5,195,827 of Audy et al. As stated by their authors, these methods are better suited for bipolar transistors than for diodes.

Zhang discusses in U.S. Pat. No. 6,554,470 the inability of Audy's method to take in account parallel parasitic effects. Zhang shows the deviations in temperature measurement for current levels above 2 mA, compared to Audy's method, however, using Zhang's I/V data, one will find that this method is less accurate than conventional devices and furthermore, if one goes above 1 mA, unnecessary concerns of self-heating will be raised.

Olfa Kanoun offered a compact behavioural model for PN-junction temperature measurement in her PhD. thesis "Neuartige Modelle zur kalibrationsfreien Temperaturmessung mit pn-Übergängen", Fortschrittberichte, Reihe 8, Nr. 905, VDI-Verlag, 2001. This model is described in two conference papers, "IEEE Instrumentation and Measurement Technology Conference Budapest, Hungaria May 21-23, 2001 and Conference Sensors and Systems, Jun. 24-27, 2002, Saint-Petersburg, Russia. This model is sensitive, at least in a simulation, to diode serial resistances above the kilo-Ohm level.

Alekseevich et al. claims in the document RU 2,089,863 an enhanced sensitivity and accuracy for temperature measurement using PN-junctions, with alternating forward and backward currents. This known circuitry requires a 3-wire sensor device, which is a drawback in respect to provide a simple and effective device for measuring temperatures by PN-junction.

From document WO 0,023,776 of Eryurek et al. The auto correction of aging effects for RTD temperature sensors is known. These sensors still need to be calibrated at the factory. To achieve the same temperature sensitivity and using the same thin film lithography fabrication technology, RTDs are huge when compared to a PN-junction or a series of PN-junctions. This embodiment requires a four-wire connection to a single sensor, which is even more complicated and costintensive than the known solution of Alekseevich et al. implying a 3-wire sensor device.

From Lunghofer et al. U.S. Pat. No. 5,713,668 the use of a self-verifying thermal sensor is known using 2 thermocouples and one RTD and the issue of thermal coupling the 3 sensors.

Dukor et al. presents in SU 1,527,515 and SU 1,543,250 two arrays of diodes as thermal sensors, but they have not presented an accurate physical model for PN-junction temperature measurement to make use of such an embodiment as an auto-calibrated and redundant sensor.

SUMMARY

In an embodiment, a more accurate method for measuring temperature without trimming or factory calibration of the sensing element and an accurate method for measuring PN-junction temperature with a 2-wire apparatus, with built-in compensation for contact and very long lead wire resistance can be obtained. In an embodiment, also on-line recalibration of the sensor and sensor aging correction without the need of pairing to a reference temperature sensor can be provided. Furthermore, in an embodiment, an application for most IC chips with externally accessible diodes can be provided. In an embodiment, a sensor conditioner that minimizes PN-junction temperature sensor cycling due to ohmic self-heating can also be provided. Finally, in an embodiment, a sensor conditioner that minimizes the drift of the ratios of the multiple current levels and that allows fabrication process variance can be provided.

A PN-junction temperature sensing apparatus may comprise a band gap based current reference, which is mirrored in 3 or higher odd number of usable 1:1 current sources wherein each mirrored current source comprise a p-type MOSFET transistor being source connected to $V_{DD}$; switches having two selectable outputs controlled by a digital processor, wherein each switch is connected with the drain of each current source and wherein a first output of each switch is connected to an anode of a PN-junction thermal sensor and a second output of each switch is connected to an anode of a sink diode and wherein the cathodes of both components are connected to a common level; and an integrated A/D converter to digitize the voltage across the PN-junction sensor, wherein the value of the digitized voltage is stored in a memory of the digital processor.

BRIEF DESCRIPTION OF THE DRAWINGS

The invention is now further explained in accordance with the attached drawings.

DETAILED DESCRIPTION

The basis for the present embodiments is the above-mentioned standard forward-bias diode equation [1], which is based on a simplified Shockley-model for the PN-junction diode according to equation [2]:

$$V = T \cdot k/q \cdot \ln(I/I_s(T)+1) \qquad [2]$$

wherein $I_0$ is a constant reference the saturation current, which is in the range of nA or pA for a small signal Si diode at ambient temperature. This makes $I/I_s(T)$ much larger than units, even with I in the μA (Micro Ampere),range, leading to the approximation implied by the conventional method. $I_s$, temperature dependance is noted here, as $I_s$, increases with temperature. This justifies the need of higher forward current levels for higher temperatures, so that the real deviation of temperature lies between 3 and 4K.

This high deviation between 3 and 4K is diminished toward a sub-Kelvin accuracy by the present embodiments by improving the model and adding a serial resistance factor ($R_s$) to said model. This requires at least one more energizing level ($I_2$) and is written as a system of two or more equations, wherein for n current levels, the n-1 equation system is $$\Delta V_1 = T \cdot k/q \cdot \ln(I_1/I_0) + Rs \cdot (I_1-I_0) \qquad [3a]$$

$$\Delta V_2 = T \cdot k/q \cdot \ln(I_2/I_0) + Rs \cdot (I_2-I_0) \qquad [3b]$$

$$\Delta V_{n-1} = T \cdot k/q \cdot \ln(I_{n-1}/I_0) + Rs \cdot (I_{n-1}-I_0) \qquad [3c]$$

For a minimum of 3 current levels, Rs is eliminated:

$$\Delta V_2 - (I_2-I_0)/(I_1-I_0) \cdot \Delta V_1 = T \cdot k/q \cdot \ln(I_2/I_0 \cdot (I_0/I_1)^{[(I_2-I_0)/(I_1-I_0)]}) \qquad [4]$$

If only the ratios between $I_2$, $I_1$, and $I_0$ are accurately known, all the currents can be written in $I_0$ only. This further allows $I_0$ to be limited. Especially for equation 4 and for the case of 3 identical current sources, $I_2 = 3 \cdot I_0$ and $I_1 = 2 \cdot I_0$, [equation 4] is rewritten as $$\Delta V_2 - 3/2 \cdot \Delta V_1 = T \cdot k/q \cdot \ln(3 \cdot (1/2)^{[3/2]}) \qquad [5]$$

The serial resistance of a proper PN-junction model takes into account the aging of the diode-based temperature sensor. This technique can be further enhanced by comparing the response of two equivalent PN-junctions of the same die but with divergent electrical usage.

High-density IC structures of PN-junction thermal sensors are today commonplace for thermal imaging systems and non-contact thermometry. But none of these structures take advantage of a physical model for PN-junction temperature calibration. Normally, the calibration of such devices requires at least the knowledge of the two temperatures for the respective currents passing through the diode, forward biased with a constant voltage.

In contrast to the conventional devices the present embodiments provide a PN-junction temperature sensing apparatus comprising:

a band gap based current reference, which is mirrored in 3 or higher odd number of usable 1:1 current sources, wherein each mirrored current source comprises a p-type MOSFET transistor being source connected to $V_{DD}$;

switches having two selectable outputs controlled by a digital processor wherein each switch is connected with the drain of each current source and wherein a first output of each switch is connected to an anode of a PN-junction thermal sensor and a second output for each switch is connected to an anode of a sink diode and wherein the cathodes of both components are connected to a common level;

an integrated A/D converter to digitize the voltage across the PN-junction sensor, wherein the value of the digitized voltage is stored in a memory of the digital processor.

This apparatus has the advantage of self calibration, an extended temperature range, a minimum A/D converter bit resolution and a microvolt level resolution. Furthermore the choice between 2 or more current source banks can be available. In this context, a bank is a set of 1:1 current sources. Different banks use different current source ranges. One bank would cover the tenths of micro-Amps range, the other the hundreds of micro-Amps and so on so that a broad range of temperatures and diode areas fits to a single, narrow A/D converter range.

The current ratios between two different current source banks can be unknown within the tolerance range, only the current ratios within a current source bank need to be accurately known.

In an auto-calibration perspective, the ratio between two current source banks should be preferably found using an internal resistor, in such a way that the maximum level for the lower energy bank and the lowest level for the higher energy bank can fit in the A/D converter range. It is also possible to use this ratio as a fitting parameter. The resistor can be selected from an internal bank of resistors. Its value doesn't need to be accurate and it is allowed to long-term drift (aging). The only concerns are that resistivity must be fairly stable inside the adopted IC technology typical working temperature range and that the current density must not be high enough to heat the integrated thin-film resistor beyond that upper limit. A polysilicon resistor is adequate in CMOS.

The evaluated ratios between current source banks can be recorded on non-volatile memory (e.g. NVRAM, EEPROM, Flash) for system and user troubleshooting reference. The (n-1) ratios within an n current source bank can be checked with the internal resistor and should be included in a BIST routine. If they are not according to the design parameters, the device is faulty and should be scrapped.

Ohmic self-heating cycling of sensing element is an inherent phenomenon. The low ratios available from the current source bring the advantage of the minimizing such phenomenon. Furthermore, choosing the energizing sequence order such that the average of each two sequential energizing steps is as near as possible to the $I_0(n+1)/2$ current level average of the whole cycle, further minimizes the temperature variation of the sensing element.

The ability to choose between two or more banks of current sources also allows collecting a wide sensitivity from a broad range of diodes over a wide range of temperatures. For very small area diodes, the appropriate choice of current bank(s) minimizes the risk of breaking down the PN-junction, thus decreasing its aging rate, when compared to the conventional devices. The use of higher energizing levels for higher temperatures can be beneficial in surface contact thermal measurements.

Ninety-nine current levels are attainable with two banks of 9 1:1 current sources and a 10:1 ratio between banks. While an untrimmed device cannot offer a specific discrete step due to the failure in accomplish the rigorous 10:1 bank to bank ratio, the 99 current values can still be selectable, giving place to the claim of a selectable multi-ratio current source. $(n+1)^z-1$ current values can be made with z n-step current banks, since the zero value is not usable.

The preferred choice of n current sources to produce n current levels along n-step cycles according to the subject matter of claim 1, where n is an odd number equal or above 3, is justified by its simplicity and such an arrangement uses each current source an integer number of times in an n-step cycle. Thus, it is then feasible that the use condition of each the current sources-switch cell is the same. In other words, the use of each switch has an identical pattern along the n-step cycle. If n is even, half the current sources would be used $(n+2)/2$ times and the other half $n/2$ times along n steps. It would be then necessary to use 2 cycles to average the use of the current switches and create identical cycle conditions. Furthermore, if the n-step cycles are shifted n times, each level is averaged by the n different switch configurations and the problem of the even number is inherently solved.

In an embodiment the PN-junction thermal sensor is made of re-usable IC-scrap material. In this context, IC "scrap" is defined as any assembled chip or bare die that, due to the fabrication defects of functional failure, cannot fulfil its original purpose of functionality, but still has available a set of PN-junctions, diode-like connected, which can be used as a thermal sensor. Those PN-junctions can be, but are not limited to, the protective diodes available at most of the IC pins.

The advantage of this embodiment is shown by an example of using a scraped DRAM chip, but the application of IC scrap as thermal sensors is extendable for all kinds of circuits and technologies, not just silicon memories. ESD protection and guard-ring diodes are common-used structures on any small signal device. Compared to a basic functional cell, these diodes are quite big. They should be then less sensitive to front-end process variations and still be usable.

Such a scraped DRAM chip comprises for example the following diodes:

| + | − | + | − | + | − | + | − |
|---|---|---|---|---|---|---|---|
| VSSQ | DQx | VDDQ | VDD | VSS | VSSQ | VSS | VDD |
| VSSQ | VDDQ | VSSQ | VDD | VSS | Addx | VSS | VDDQ |
| DQx | VDDQ | VSSQ | VSS | VSS | DQx | | |

In the same DRAM chip there are either diodes with a different area magnitude or perfect equivalents, to those using one of the 16 DQx or of the 13 Addx pads. One can count a total of 68 diodes available. The proposed method offer such latitude that any of the diodes can be used, without restriction, as the sensing element.

Avoiding address inputs (Addx) of the DRAM-chip makes possible the most favourable relation of 55 diodes for 20 pads. The following table shows the most favourable configuration of each number of pads:

| Pads | #2-wire pads | #diodes-IC |
|---|---|---|
| VSS, VSSQ | 2 | 2 |
| VSS, VSSQ (VDDQ or VDD) | 3 | 4 |
| FSS, VSSQ, VDDQ, VDD | 4 | 7 |
| VSS, VSSQ, VDDQ, VDD, DQx | 5 | 10 |
| VSS, VSSQ, VDDQ, VDD, DQx, Dqy | 6 | 13 |
| VSS, VSSQ, VDDQ, VDD, DQx, Dqy, DQz | 7 | 16 |
| N < 14 | 7 + n | 16 + 3n |

Although IC scrap chips as the above-mentioned DRAM can provide an interesting number of available diodes, special custom structures can provide the best diode/pad ratio. This is a concern of sensor layout area, package size, thermal insulation, I/O complexity, multi-wire cable usage, which are all related to the cost of the sensor. Typically, $(n/2)^2/n=n/4$ ratio, n being the number of pads, is available at thermal image systems. $n \cdot (n-1)/n=n-1$ ratios can be achieved by conventional structures. These structures achieve the mathematical maximum $n!/(n-2)!$ number of arrangements for inverted diodes achievable by 8 and 6 pads, respectively. But none of the conventional thermal image array are based on PN-junction elements according to the present embodiments. A thermal imager sensor using the structures will benefit from the lowest I/O layout mathematically achievable according to the present embodiments, never attained in conventional devices.

In a further embodiment the sink diode is substituted by another PN-junction thermal sensor device. In this case of a 3-wire sensor embodiment the sink diode is substituted by another sensor diode, with independent anodes and a common cathode. This way has the advantage that a cycling of thermal ohmic effects on the sensor device is eliminated because the supplied current is constant and dissipated on the same device. This specific arrangement minimizes sensor conditioner self-heating heating. Using a second A/D converter or a multiplexed A/D converter, both diodes can be used for temperature measurement, although the "sink" diode will only reach the n−1 energizing level.

In another embodiment the apparatus has a current source layout for n current levels with at least a low current bank and a high current bank and comprises one more transistor for current reference, wherein the source of said transistor is connected to its gate. With this transistor for current reference the present embodiments offers a way to calculate and control the ratio between two current source banks using only the PN-junction temperature sensor. First it should be noted that the ratio between them should be one order of magnitude (around 10). Second, PN-junction temperature measurement is sensitive to current level: it is expected that measuring with the high current bank would provide a slightly higher temperature result than using the low current bank, due to ohmic self-heating effects. As for which of the measurements is more accurate is a heat transfer problem. By choosing adequate current levels it is possible to point 0.5 to 0.7 V as good reference levels for measuring from ambient temperature to 425K, dropping two decimals to reach 550K and adding two decimals for cryogenic temperature measurements.

Further can be preferred that one memory of said digitized processor to store measured and digitized voltage values is a non-volatile memory preferably one of the group EEPROM, Flash or NVRAM. This embodiment has the advantage that the stored I/V data can be correlated and converted to temperature using at least one of the model equations presented previously. A DSP or software running on a standard PC or even a dedicated single board computer can conduct either such computational work.

A record with the significant model parameters presented earlier should be kept for each diode sensor. This record is the source to dictate the "end of life" of the sensing PN-junction. At least the temperature and another model parameter history are kept in non-volatile memory, e.g. NVRAM, EEPROM, Flash. The record scheme should be dynamic, increasing the recording rate for an increasing concern PN-junction behaviour drift. The advantage of this is to predict the life expectancy for each PN-junction, which has not been claimed in conventional devices.

Using a bank of n identical current sources, it is shown below that n can be chosen such that no multiplying factor is needed for any $\Delta V$ (or exponent for the respective current ratio mantissa) to achieve Rs elimination. It is emphasized that this is not a restriction. It is just a way to prevent the statistical weight of any $\Delta V$ increasing above 1. This is a concern for small $\Delta V$s, where relative errors are more prominent.

The solution is to choose n such that half the cumulative sum from 1 to (n−1) is even. Referring to equations 3a to 3c, as mentioned above, this corresponds to the range from $$I_1 - I_0 = (2-1) \cdot I_0 \quad [6]$$

to $$I_{n-1} - I_0 = (n-1) \cdot I_0 \quad [7]$$

that are the terms to be cancelled within Rs. Its sum results in $n \cdot (n-1)/2$. The allowed values for representing by the successions $$n = 4N, \text{ if n is even} \quad [8]$$

and $$n = 4N+1, \text{ if n is odd} \quad [9]$$

where N is an integer: {1,2,3, . . .}. In the case where n is odd, an even set number of equation 3 is generated, making possible a logarithm argument with numerator and denominator of the same order. This leads to $I_0$ cancellation. Note, that for 9 identical current sources, whose attainable ratios are noted as $r_8 = I_8/I_0$, $r_7 = I_7/I_0$ and so on until $r_1 = I_1/I_0$, we can write $$\Delta V_8 + \Delta V_4 + \Delta V_3 + \Delta V_2 + \Delta V_1 - \Delta V_7 - \Delta V_5 = T \cdot k/q \cdot \ln(r_8 \cdot r_4 \cdot r_3 \cdot r_2 \cdot r_1/(r_7 \cdot r_6 \cdot r_5)) \quad [10]$$

or $$\Delta V_8 + \Delta V_5 + \Delta V_4 + \Delta V_1 - \Delta V_7 - \Delta V_6 - \Delta V_3 - \Delta V_2 = T \cdot k/q \cdot \ln(r_8 \cdot r_5 \cdot r_4 \cdot r_1/(r_7 \cdot r_6 \cdot r_3 \cdot r_2)) \quad [11]$$

However, equation 11 is better conditioned, since it balances the numerator and the denominator order, thus cancelling all the $I_0$ terms. Conversely, equation 10 results in a logarithm argument having a square I0 term at the quotient.

The logarithmic argument of equation 11 is 40/63. As a heuristic, the terms should be re-arranged for a positive term, i.e. with an over-unit logarithm argument. Computationally, this provides more accurate numerical results.

The methods disclosed in U.S. Pat. No. 5,195,827 and U.S. Pat. No. 6,554,469 are the bipolar transistor equivalents to our claim. Although they are also applicable to diodes, none of them provide the freedom of choosing any current levels in a number equal or above three as our method does. Furthermore, at U.S. Pat. No. 6,554,469 it has been overlooked that transistor gain $\beta$ is not necessarily constant for the different current levels. This assumption is implicit where $1+1/\beta$ terms are cancelled from equation 1 to equation 2 and becomes serious when the allowance of large current ratios is claimed as a major advantage of the embodiments. According to embodiments there is an applicability for any PN-junction in any IC technology particularly for a PN in silicon carbide (SiC) technology which can provide temperature measurement up to or even above 1000K, while silicon is considered to have an upper limit of 425K.

At the price of a faster aging rate of the silicon diode sensor with an adequate diode conditioning, e.g. energizing levels in the tenths of mA range, the ability to achieve 550K measurability is possible by using the multi-level conditioner according to the embodiments.

Rs is a good aging parameter since it increases with time due to electromigration in conductors and corrosion in contacts. However, it can't be accurately known as an independent parameter, but rather embedded in the $Rs \cdot I_0$ product. Recalling equation 3a:

$$\Delta V_1 = T \cdot k/q \cdot \ln(I_1/I_0) + Rs \cdot (I_1 - I_0) \quad [30]$$

it can be written as $$\Delta V_1 = T \cdot k/q \cdot \ln(r_1) + Rs \cdot (r_1 - 1) \cdot I_0 \quad [12]$$

and requires the knowledge of $I_0$ accurate value. While still presenting this last equation as fundamental of the present embodiments, it is not within our scope to present a method for current source calibration for an absolute value. We must point out, nevertheless, that for the most common case where the thermal sensor is exposed to higher temperatures and thermal stress than its conditioner, I0 drift is negligible against Rs aging drift. Under this condition, $Rs \cdot I_0$ drift is predominantly due to Rs (sensor drift) instead of $I_0$ (current source drift) However, in the case of cryogenetic or long-term ambient temperature measurement, absolute determination of $I_0$ should be implemented.

Under the normal conditions stated above two alternatives for sensor aging parameters are proposed:
a) record temperature—$\Delta V_{n-1}$ during the time. $\Delta V_{n-1}$ is the difference between the voltage response from the higher to the lower current level, $I_{n-1}$ to $I_0$ respectively. With sensor aging, an $Rs \cdot I_0$ increase is observed as a proportional drift over the $\Delta V$, as $(n-1) \cdot \Delta(Rs \cdot I_0)$. This method is particularly useful when $Rs \cdot I_0$ has been cancelled from the equation model and not needed for temperature determination, as are the cases of equation 4, equation 5 or equation 11. The storage thus allows long term comparison for same temperature measurements.
b) calculate $Rs \cdot I_0$ itself as a fitting parameter of the n−1 set of equation 3 being n the number of current levels. Without excluding other analytical or numeric methods for solving multivariable systems of simultaneous equations, T and the $Rs \cdot I_0$ extraction can be done with a Newton-Raphson method for the lowest sum of quadratic errors (minimum squares method) between measured and calculated $\Delta Vs$. Temperature—$Rs \cdot I_0$ pairs are the source data for the long term comparison.

A further conventional model is based on equation [13]:

$$V = T \cdot k/q \cdot \ln(I/I_s(T)) + a_1(T) \cdot (1 - I/I_0)/(1 + [I/I_0]\hat{\ } a_2(T)) \quad [13]$$

$a_1(T)$ and $a_2(T)$ are parameters for the description of high current characteristic behaviour and $I_0$ is a constant reference current. This is a four-parameter method, requiring at least 4 I-V measurements for each temperature. Using the above-mentioned previous notation, one can eliminate $I_s(T)$, producing at least 3 simultaneous equations:

$$\Delta V_1 = T \cdot k/q \cdot \ln(I_1/I_0) + a_1(T) \cdot (1 - I/I_0)/(1 + [I/I_0]\hat{\ } a_2(T)) \quad [14a]$$

$$\Delta V_{n-1} = T \cdot k/q \cdot \ln(I_{n-1}/I_0) + a_1(T) \cdot (1 - I_{n-1}/I_0)/(1 + [I_{n-1}/I_0]\hat{\ } a_2(T)), n \geq 4 \quad [14b]$$

or $$\Delta V_1 = T \cdot k/q \cdot \ln(r_1) = a_1(T) \cdot (1 - r_1)/(1 + [r_1]\hat{\ } a_2(T)) \quad [15a]$$

$$\Delta V_{n-1} = T \cdot k/q \cdot \ln(r_{n-1}) + a_1(T) \cdot (1 - r_{n-1})/91 + [r_{n-1}]\hat{\ } a_2 (T)), n \geq 4 \quad [15b]$$

Temperature and the other parameter extraction can be done with the Newton-Raphson method for the lowest sum of quadratic errors (minimum square method).

This method is found to be sensitive to increasing serial resistance. Therefore, in order to eliminate Rs influence, one can add aging the Rs parameter in the equation above, resulting in equations 16 and 17.

$$\Delta V_1 = T \cdot k/q \cdot \ln(I_1/I_0) + a_1(T) \cdot (1 - I/I_0)/(1 + [I/I_0]\hat{\ } a_2(T)) + Rs \cdot (I_1 - I_0) \quad [16a]$$

$$\Delta V_{n-1} = T \cdot k/q \cdot \ln(I_{n-1}/I_0) + a_1(T) \cdot (1 - [I_{n-1}/I_0]\hat{\ } a_2(T)) + Rs \cdot (I_1 - I_0), n \geq 5 \quad [16b]$$

or $$\Delta V_1 = T \cdot k/q \cdot \ln(r_1) + a_1(T) \cdot (1 - r_1)/(1 + [r_1]\hat{\ } a_2(T)) + Rs \cdot (r_1 - 1) \cdot I_0 \quad [17a]$$

$$\Delta V_{n-1} = T \cdot k/q \cdot \ln(r_{n-1}) + a_1(T) \cdot (1 - r_{n-1})/(1 + [r_{n-1}]\hat{\ } a_2 (T)) + Rs \cdot (r_{n-1} - 1) \cdot I_0, n \geq 5 \quad [17b]$$

Rs can be eliminated as shown previously (equation 4, 5 and 11). The Rs independent equation may then substitute one of the n−1 set of equation 17.

Thus, the present embodiments provide a measurement uncertainty of 0.4K and a deviation of 0.25K for excitation levels between 10 nA and 50 mA over a broad temperature range.

Since $a_1(T)$ and $a_2(T)$ parameters are dependent from excitation levels (and any drift of them), they should not be used as an aging parameter. Direct V measurements and $Rs \cdot I_0$ are again suggested possibilities. It should be noted that parameter extraction in the conventional device is computing intensive. Referring to the numeric iteration according to an embodiment good results were achieved using T and $Rs \cdot I_0$ estimations, −1 for $a_1(T)$ and 1 for $a_2(T)$ as starting initial values.

Using 10 kHz switch clock for a 9 step current source as previously described, a speedy 100° C./s changing rate, achievable in RTP processes would cause an error of almost 1 Kelvin on the 9-cycle embodiment or 90 mK on the single cycle. Using a smaller subset of the 9 sequential levels, the last value can be proportionally lowered, but reducing the number of measuring points would increase the model fitting error caused by a cell current mismatch and background noise. In any case, a 1 Kelvin temperature error is very acceptable for heating control. Further precision can be achieved with a higher switch clock. The precision is limited either by the intrinsic error or the chosen mathematical model, cell current mismatch due to front-end process variance, and by background error.

If one supposes two 9-level current source banks. $I_0, I_1, \ldots I_8$ are the 9 current levels available from the low power current source bank and $c \cdot I_0, c \cdot I_1, \ldots c \cdot$ are the 9 current levels available from the high power current source bank, where c is the unknown multiplier (around 10). A cycle using the high power current source bank alone would provide similar equations to those already presented, since the c factor would be cancelled and $Rs \cdot I_0$ would lead to the $c \cdot Rs \cdot I_0$, where c cannot be figured out unless $Rs \cdot I_0$ would be already known from the low power current source bank. Using a lower level (or reference level) from a different combination of power source banks, than the other 8 subsequent levels, we can estimate c is a 9-step cycle, while minimal energy deviation from a usual cycle using the high-power current source bank alone.

a) Take the reference level as the maximum level attainable by the low-power current source bank ($9 \cdot I_0$) and subsequent 8 levels from high-power current source bank.

$$\Delta V_1 = T \cdot k/q \cdot \ln(2 \cdot c/9) + Rs \cdot I_0 \cdot 9 \cdot (2 \cdot c/9 - 1) \quad [18]$$

$$\Delta V_8 = T \cdot k/q \cdot \ln(9 \cdot c/9) + Rs \cdot I_0 \cdot 9 \cdot (9 \cdot c/9 - 1) \quad [19]$$

Make in this case the transformation constant=c/9 b) Take the reference level as the minimum level attainable by combining both current source banks $(c+1) \cdot I_0$ and subsequent 8 levels from high-power current source bank.

$$\Delta V_1 = T \cdot k/q \cdot \ln(2 \cdot [c/(c+1)]) + Rs \cdot I_0 \cdot (c+1) \cdot (2[c/(c+1)] - 1) \quad [20]$$

$$\Delta V_8 = T \cdot k/q \cdot \ln(9 \cdot [c/(c+1)]) + Rs \cdot I_0 \cdot (c+1) \cdot (9[c/(c+1)] - 1) \quad [21]$$

Make in this case the transformation constant=c/(c+1)

c) Take the Reference level as the minimum level attainable by the high-power current source bank $c \cdot I_0$ and subsequent 8 levels by the combination of both current source banks.

$$\Delta V_1 = T \cdot k/q \ln(2 \cdot [(c+1)/c]) + Rs \cdot I_0 \cdot c \cdot (2 \cdot [(c+1)/c] - 1 \quad [22]$$

$$\Delta V_8 = T \cdot k/q \cdot \ln(9[(c+1)/c]) + Rs \cdot I_0 \cdot c \cdot (9 \cdot [(c+1)/c] - 1 \quad [23]$$

Make in this case the transformation constant=(c+1)/c.

The solution c) outputs almost 10% of power over a standard 9-step cycle using the high-power source bank alone. The power deviation both on a) and b) solutions is about 0.25%. Observe that a sequence with these two would cancel the (small) power deviation.

Whichever equation set and transformation is used, the constant can then be determined by a standard numeric method.

All methods presented above can be used to any number of serial diodes and adopted for voltage stimulus/current measurement.

Figure 1:
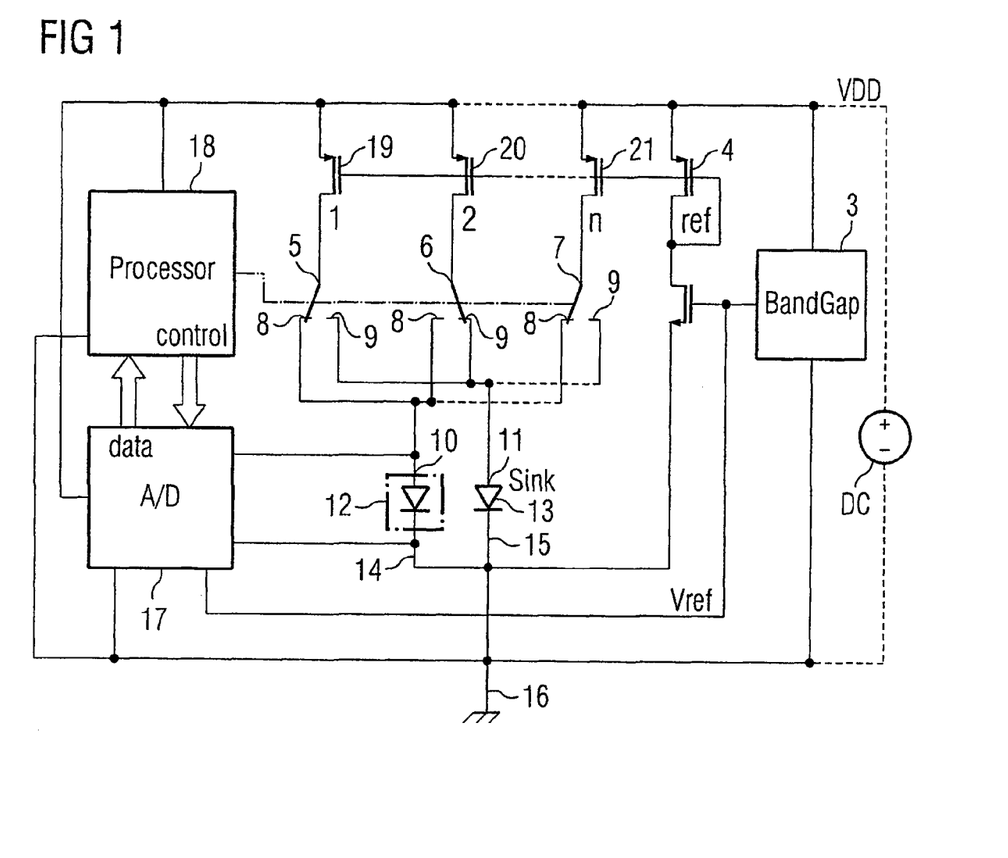
FIG. 1 shows a block diagramm of a PN-junction temperature sensing apparatus according to a first embodiment.

FIG. 1 shows a block diagramm of a PN-junction temperature sensing apparatus according to a first embodiment. This PN-junction temperature sensing apparatus comprises a band gap 3 based current reference 4. This current reference 4 is mirrored in 3 or higher odd number of usable 1:1 current sources 1, 2, n. Each mirrored current source 1, 2, n comprises a p-type MOSFET transistor 19, 20, 21 which is source connected to $V_{DD}$. The apparatus comprises further switches 5, 6 and 7 having two selectable outputs 8 and 9. These selectable outputs are controlled by a digital processor 18. Each switch is connected with the drain of each current source 1, 2, n. The first output 8 of each switch 5, 4, 7 is connected to an anode 10 of a PN-junction thermal sensor 12. A second output 9 of each switch 5, 6, 7 is connected to an anode 11 of a sink diode 13. The cathodes 14, 15 of both components 12, 13 are connected to a common level 16, which is a ground level.

The apparatus further comprises an integrated A/D converter 17 to digitize the voltage across the PN-junction sensor 12. The values of the digitized voltages are stored in a memory of the digital processor. One output of each switch is connected to the anodes of the diode sensor and the other to a sink diode. The advantage of such an arrangement, instead of a simply switch on-off of the current source over the sensor diode, is to limit the voltage across the switch, thus minimizing the leakage current, which either adds or subtracts to the diode current. The cathodes of both diodes are connected to a common level like ground level and an integrated A/D converter digitizes the voltage across the diode sensor. This value is stored in memory with its associated excitation step by the Digital Processor.

The layout of said PN-junction temperature sensing apparatus should use proper symmetry, interdigitizing and dummy techniques to minimize performance deviation among switches or current sources. Since the current output for any 2 matches single cells can still vary within 1%, due to doping and geometry IC front-end process variance, shifting mechanims should be used to cancel them. There are 3 interesting configurations:

a) Best averaging of current source usage. Using an odd number of current levels, the switch array usage and layout can be symmetric, but the current source layout would not be symmetric, without proper transistor division like in FIG. 7. For n current levels, there is the need for one more transistor for the current reference. This transistor is the only one with the source connected to the gate. Layout symmetry is achieved by arranging the current sources in two mirrored half parts. The switch number can be doubled and the layout arranged accordingly. The switch usage for n current levels is shifted along n cycles like in FIG. 5. The minimum time for each temperature measurement is $n^2$ (time step).

b) Fastest measurement of temperature. Due to the symmetry of the previous layout and the fact that for each switch we can have identical patterned usage, the need for shifting can be dropped, making temperature measurements possible in n (time step) time.

c) Lowest layout area. If an even n number of current levels is chosen, current sources like in FIG. 6 and switch array layout can be both symmetric. Switch usage is not symmetric but can be symmetrical averaged in n-cycle or 2-cycle mirrored shift. It would be preferable to use a pattern/mirrored pattern sequence for $n^2$ (time step) temperature time measurement or at least a mirrored two cycle sequence with asymmetric switch use on each cycle for 2n·(time step) temperature time measurement ($2^{nd}$ cycle and $2^{nd}$ mirrored cycle on FIG. 4).

Figure 2:
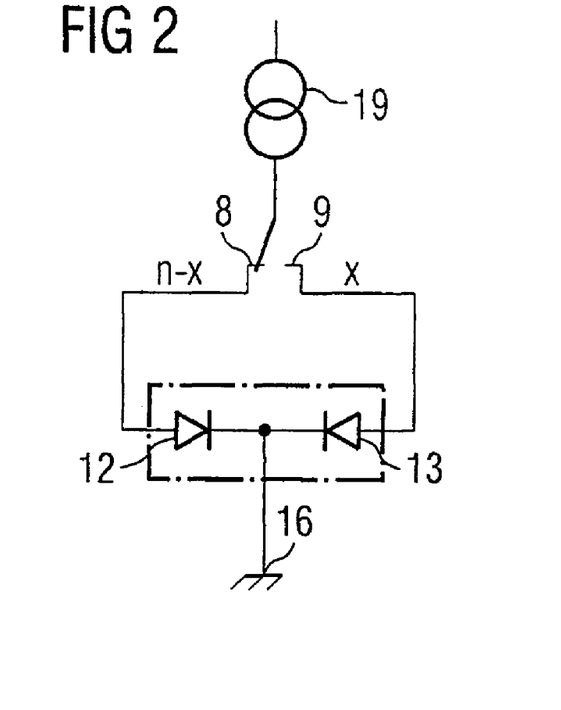
FIG. 2 shows a 3-wire sensor according to a second embodiment.

FIG. 2 shows a 3-wire sensor according to a second embodiment. This 3-wire sensor has 2 sensing PN-junction elements 12 and 13. One of them can be used as "sink" diode 13, whilst the other one is acting as sensing PN-junction element.

Figure 3:
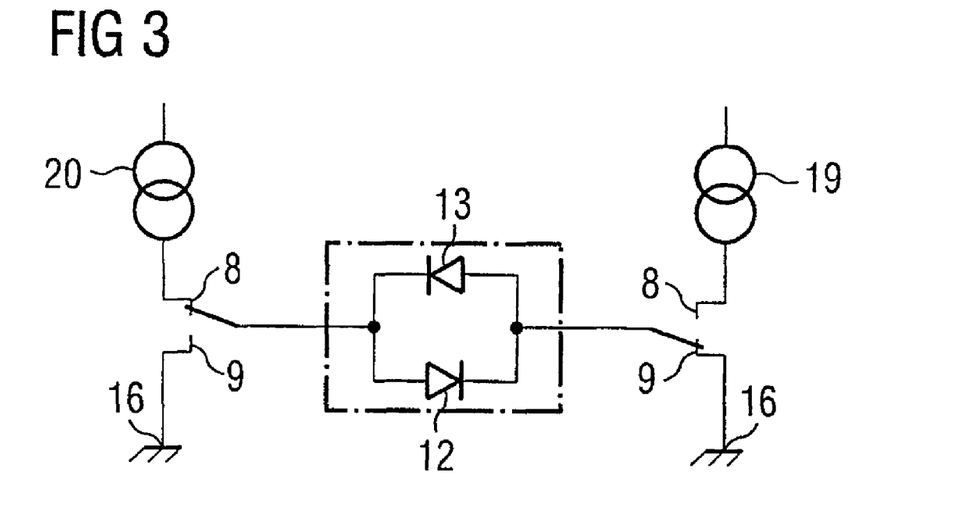
FIG. 3 shows a 2-wire sensor according to a third embodiment.

FIG. 3 shows a 2-wire sensor according to a third embodiment. This 2-wire sensor has 2 PN-junction sensing elements 12 and 13 and the respective power sources 19 and 20, alternatively selectable.

In a low power application, typical of extreme lightweight portable probes, a T=f(V) function can be built for each current level from previous data. This function can be acquired in a slow thermal changing environment, and will serve, for example, as a look up table for computational-free readout, and dropping the need for computing power. The calibration environment, done with the power supply from a docking station, can be a hot liquid slowly cooling in open environment, a controlled built-in heater of thermal chips or highly energizing a PN-junction. An interesting configuration would be to use the proposed embodiment with reverse diodes, on a 2-wire configuration like in FIG. 3: reverse connecting a power diode with a small signal diode makes it possible to select between them just changing bias polarity. Active heating control can be performed for a single and uncalibrated high-power current source using the same A/D converter, knowing that for each decrement of 2 mV in forward bias, the temperature of the silicon PN-junction has increased roughly 1° C. Proper switching mechanisms are needed to couple and decouple the A/D converter to the diodes and the respective current sources. If needed, the current sources can be operated constantly at the average (n+1)/2 level, if n is an odd number, or at the average n/2 or (n+2)/2 level, if n is an even number.

The T=f(V) function parameters should be checked often (e.g. on each battery recharging of the portable probe), as they change with diode aging. These functions cannot take into account lead wire and contact resistance variations with time and should be avoided in particular when measuring temperatures under vibration or in corrosive environments.

The following equations describe the behaviour of a thermal sensor:

$$\ln(I) = C - S/T \qquad [24]$$

and $$S = q \cdot (Vd - V)/(n \cdot K) \qquad [25]$$

Wherein n is the ideal coefficient for the crystal, varying from 1.1 for an ideal PN-junction to 1.7 for a polycrystalline semiconductor, Vd is a diffusion potential of PN-junction, S the temperature sensitivity of current I and C is a constant. The same sensitivity is achieved using the same V. On this condition, S and C values are estimated from equation 1 measuring I, at constant V, for at least two known temperatures. Using equation 2, two known S-V pairs are required for Vd and n determination.

The method allows calibrating a PN-junction array for thermal images device even without knowing its temperature. To achieve this at least 1 more V (sensitivity) level has to be used. The V-I results for each temperature wherein (only two are needed) are fitted to one of the methods presented for temperature extraction. From this point, S, C, Vd and n are calculable.

Any prior work about thermal (imaging) sensors using PN-junctions as sensing element can be enhanced by the present embodiments.

A very promising device can be foreseen from the association of the present embodiments with "A miniaturized self-calibrated pyrometer microsystem", presented on 23 Sep. 2003 at the Eurosensors XVVII Conference, by L. M. Gonçalves, L. G. Gomes, S. F. Ribeiro, C. Couto and J. H. Correia. Their pyrometer can deliver emissivity independent temperature measurements down to 0° C. Our work can deliver accurate temperature measurement of the two thermopiles without fab trimming or one-time calibration.

Figure 4:
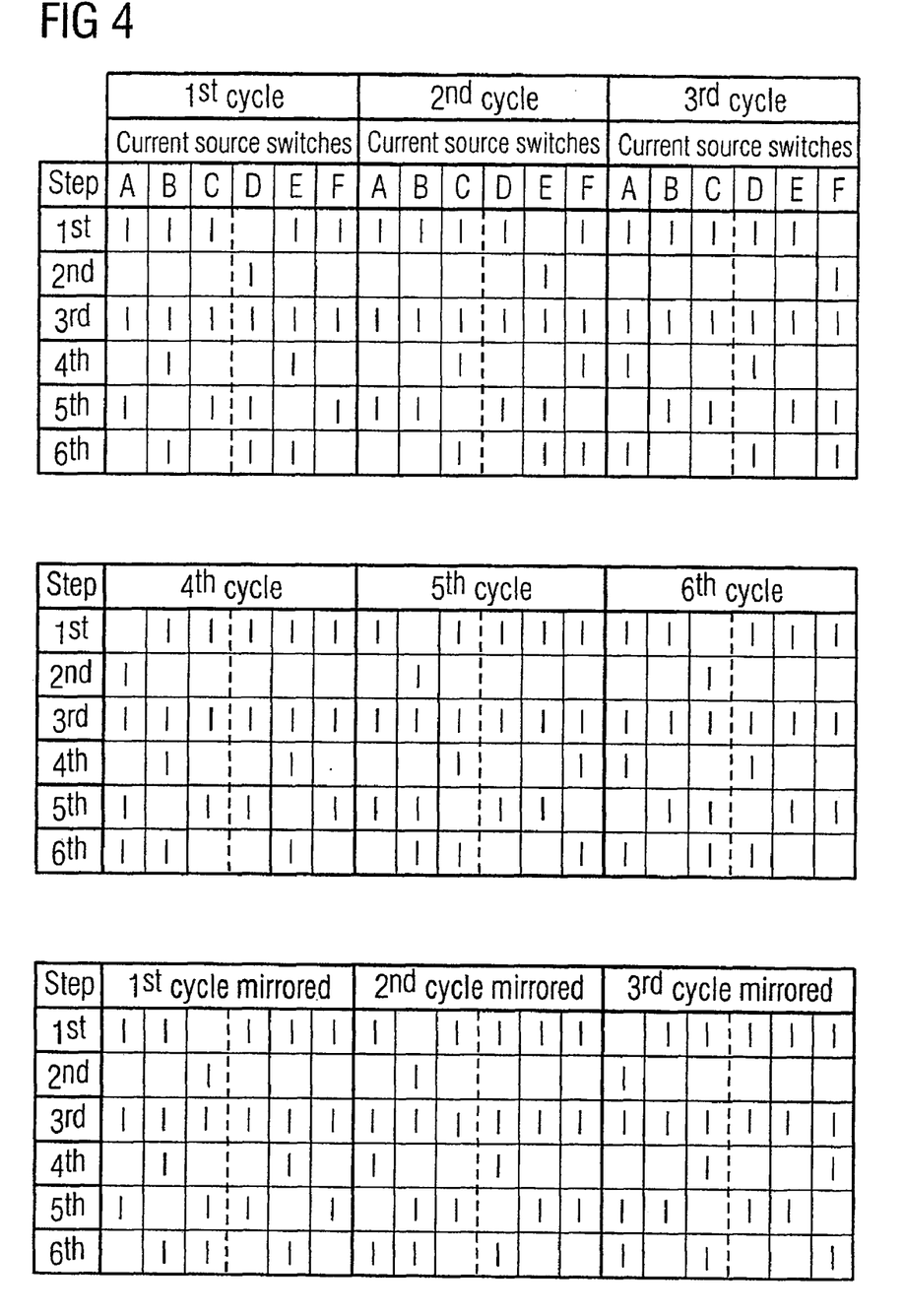
FIG. 4 shows an example of a 6 level current source bank switching usage.

FIG. 4 shows an example of a 6 level current source bank switching usage. "|" represents a switch forwarding the current towards the sensing PN-junction. A blank represents a switch forwarding the current to the "sink" diode. Current source usage is better averaged using a cycle/mirrored cycle scheme than the sequence from the $1^{st}$ to the $6^{th}$ cycle.

Figure 5:
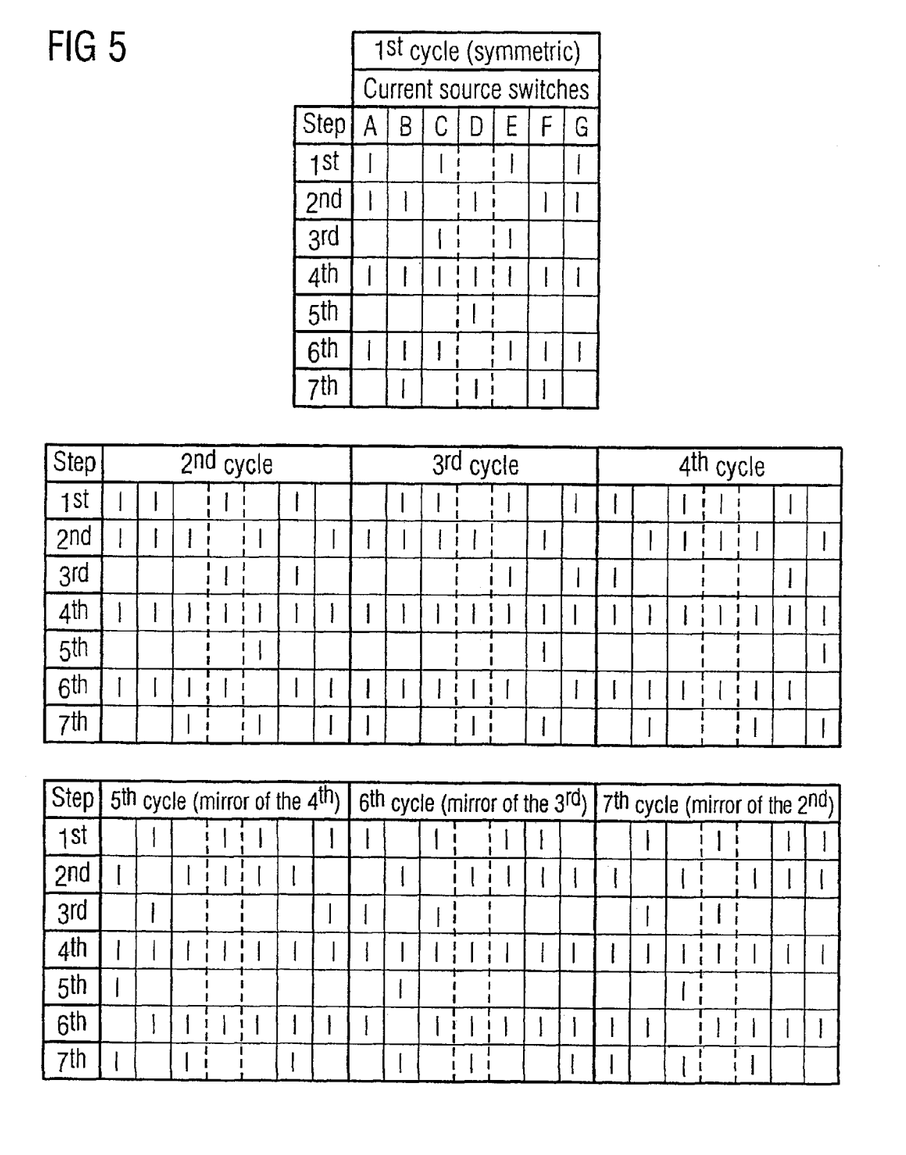
FIG. 5 shows an example of a 7 level current source bank switching usage.

FIG. 5 shows an example of a 7 level current source bank switching usage. "|" represents a switch forwarding the current towards the sensing PN-junction. A blank represents a switch forwarding the current to the "sink" diode. An n odd number of current levels introduce a symmetrical cycle and $(n-1)/2$ asymmetrical and mirrorable cycles.

Figure 6:
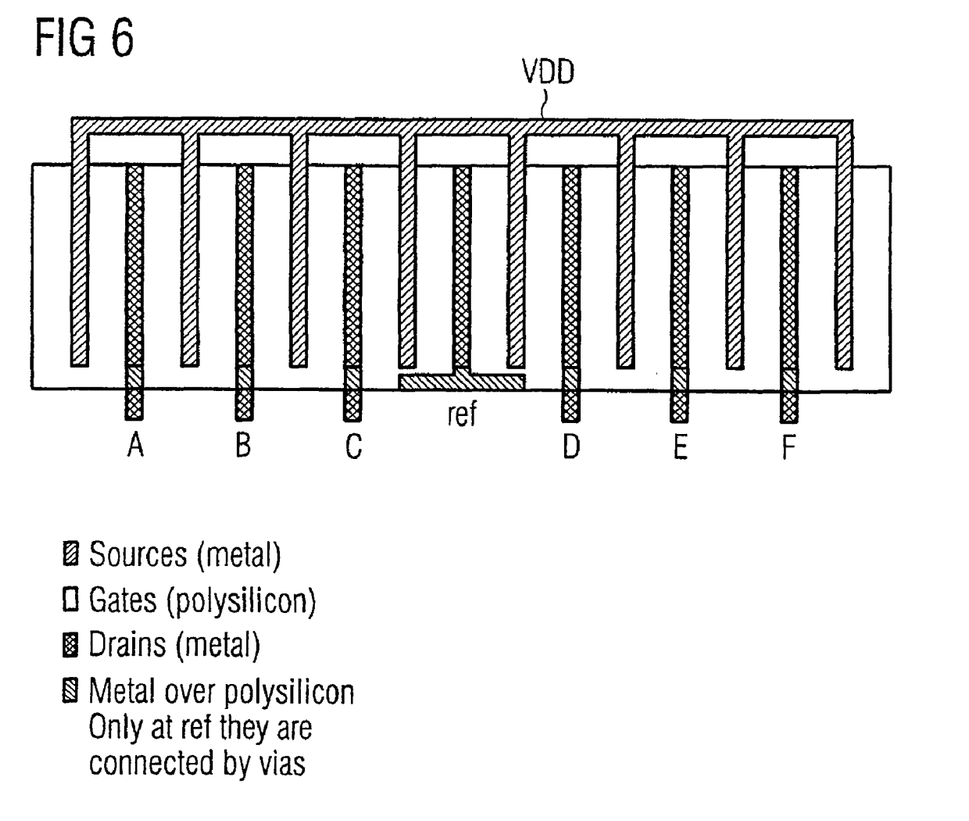
FIG. 6 shows an example of a simplified layout of a 1:1 ratio current source.

FIG. 6 shows an example of a simplified layout for PMOS 6-level 1:1 ratio current source. An even number of current levels allows a symmetric layout without transistor split.

Figure 7:
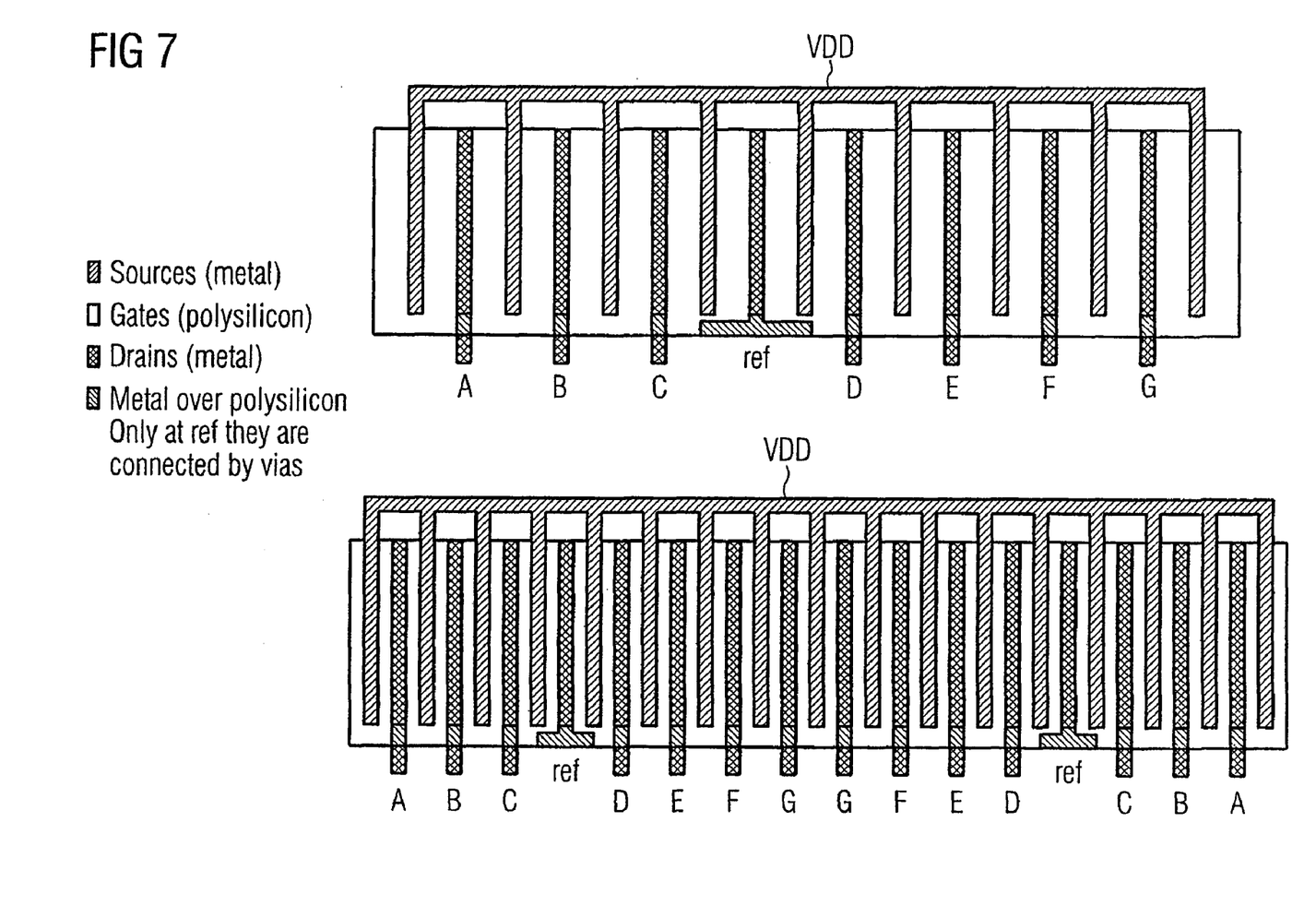
FIG. 7 shows an example of another simplified layout of a 1:1 ratio current source.

FIG. 7 shows an example of another simplified layout for PMOS 7-level 1:1 ratio current sources. Without transistor split, the layout is asymmetric. Splitting the transistors has a layout area overhead, but achieves symmetry.

LIST OF REFERENCE SIGNS 1,2,n current sources
3 band gap device
4 current reference
5,6,7 switches
8 first output
9 second output
10 anode of PN-junction thermal sensor
11 anode of "sink" diode
12 thermal sensor
13 "sink" diode
14 cathode of thermal sensor
15 cathode of "sink" diode
16 ground level
17 A/D converter
18 digital processor
19 power source
20 power source
21 power source

What is claimed is:

1. A PN-junction temperature sensing apparatus comprising:
a plurality of current sources, wherein each current source comprises a p-type MOSFET transistor being source connected to a supply voltage;
a band gap based current reference, which is mirrored in the plurality of current sources;
switches having two selectable outputs controlled by a digital processor, wherein each switch is connected with the drain of each current source and wherein a first output of each switch is connected to an anode of a PN-junction thermal sensor and a second output of each switch is connected to an anode of a sink diode and wherein the cathodes of both components are connected to a common level, wherein the number of current sources connected to the switches consists of an odd number of three or more, and wherein each of the current sources exhibits a current gain ratio with respect to the band gap based current reference of 1:1;
an integrated A/D converter to digitize the voltage across the PN-junction sensor, wherein the value of the digitized voltage is stored in a memory of the digital processor.

2. The apparatus according to claim 1, wherein the PN-junction thermal sensor is made of re-usable IC-scrap material.

3. The apparatus according to claim 1, wherein the source of current reference is connected to its gate.

4. The apparatus according to claim 1, wherein the current sources are arranged in two mirrored half parts.

5. The apparatus according to claim 1, wherein a memory of said digital processor is a non-volatile memory selected from the group consisting of EEPROM, Flash and NVRAM.

6. The apparatus according to claim 1, wherein a basic algorithm of the PN-junction temperature sensing apparatus is improved by adding a serial resistance factor ($R_s$) to a model, which required at least one more energizing level ($I_2$) and is written as a system of two or more equations, wherein for n current levels, the n−1 equation system is $$\Delta V_1 = T \cdot k/q \cdot \ln(I_1/I_0) + Rs \cdot (I_1 - I_0)$$

$$\Delta V_2 = T \cdot k/q \cdot \ln(I_2/I_0) + Rs \cdot (I_2 - I_0)$$

...

$$\Delta V_{n-1} = T \cdot k/q \cdot \ln(I_{n-1}/I_0) + Rs19 \, (I_{n-1} - I_0)$$

wherein $I_0$ is a constant reference current, which is in the range of nA or pA for a small signal Si diode at ambient temperature.

7. The apparatus according to claim 1, wherein the apparatus implements an improved method, which is sensitive to increasing serial resistance, resulting in the following equations 16 and 17:

$$\Delta V_1 = T \cdot k/q \cdot \ln(I_1/I_0) + a_1(T) \cdot (1 - I/I_0)/(1 + [I/I_0]^{a_2(T)}) + Rs \cdot (I_1 - I_0) \quad [16a]$$

$$\Delta V_{n-1} = T \cdot k/q \cdot \ln(I_{n-1}/I_0) + a_1(T) \cdot (1 - I_{n-1}/I_0)/(1 + [I_{n-1}/I_0]^{a_2(T)}) + Rs \cdot (I_1 - I_0) \quad [16b]$$

or $$\Delta V_1 = T \cdot k/q \cdot \ln(r_1) + a_1(T) \cdot (1 - r_1)/(1 + [r_1]^{a_2(T)}) + Rs \cdot (r_1 - 1) \cdot I_0 \quad [17a]$$

$$\Delta V_{n-1} = T \cdot k/q \cdot \ln(r_{n-1}) + a_1(T) \cdot (1 - r_{n-1})/(1 + [r_{n-1}]^{a_2(T)}) + Rs \cdot (r_{n-1} - 1) \cdot I_0, n \geq 5 \quad [17b]$$

wherein $a_1(T)$ and $a_2(T)$ are parameters for the description of high current characteristic behavior and $I_0$ is a constant reference current.

8. The apparatus according to claim 1, wherein the apparatus implements a serial resistance $R_s$ of a proper PN-junction model, which takes into account the aging of the diode-based temperature sensor, in that the response of two equivalent PN-junctions of a same die but with divergent electrical usage are composed, wherein a record with the significant model parameters is kept for each diode sensor, and wherein this record dictates the "end of life" of the sensing PN-junction and at least the temperature and a model parameter history is kept in non-volatile memory selected from the group consisting of NVRAM, EEPROM and Flash, by increasing the recording rate for an increasing PN-junction behaviour drift.

9. The apparatus according to claim 1, wherein the apparatus implements an auto-calibration, wherein a ratio between two current source banks are using an internal resistor, in such a way that the maximum level for the lower energy bank and the lowest level for the higher energy bank can fit in an A/D converter range, wherein the resistor is selected from an internal bank of resistors, wherein the resistivity of said resistor is stable inside the adopted IC technology typical working temperature range and wherein the current density is not as high to heat the integrated thin-film resistor beyond that upper limit, preferably a polysilicon resistor in CMOS-technology is implemented.

10. A PN-junction temperature sensing apparatus comprising:
- a plurality of current sources, wherein each current source comprises a p-type MOSFET transistor being source connected to a supply voltage;
- a band gap based current reference, which is mirrored in the plurality of current sources;
- switches having two selectable outputs controlled by a digital processor, wherein each switch is connected with the drain of each current source and wherein a first output of each switch is connected to an anode of a PN-junction thermal sensor and a second output of each switch is connected to an anode of another PN-junction thermal sensor device and wherein the cathodes of both components are connected to a common level, wherein the number of current sources connected to the switches consists of an odd number of three or more, and wherein each of the current sources exhibits a current gain ratio with respect to the band gap based current reference of 1:1;
- an integrated A/D converter to digitize the voltage across the PN-junction sensor, wherein the value of the digitized voltage is stored in a memory of the digital processor.

11. The apparatus according to claim 10, wherein the PN-junction thermal sensor is made of re-usable IC-scrap material.

12. The apparatus according to claim 10, wherein the source of current reference is connected to its gate.

13. The apparatus according to claim 10, wherein the current sources are arranged in two mirrored half parts.

14. The apparatus according to claim 10, wherein a memory of said digital processor is a non-volatile memory selected from the group consisting of EEPROM, Flash and NVRAM.

15. The apparatus according to claim 10, wherein a basic algorithm of the PN-junction temperature sensing apparatus is improved by adding a serial resistance factor ($R_s$) to a model, which requires at least one more energizing level ($I_2$) and is written as a system of two or more equations, wherein for n current levels, the n−1 equation system is $$\Delta V_1 = T \cdot k/q \cdot \ln(I_1/I_0) + Rs \cdot (I_1 - I_0)$$

$$\Delta V_2 = T \cdot k/q \cdot \ln(I_2/I_0) + Rs \cdot (I_2 - I_0)$$

$$\Delta V_{n-1} = T \cdot k/q \cdot \ln(I_{n-1}/I_0) + Rs \cdot (I_{n-1} - I_0)$$

wherein $I_0$ is a constant reference current, which is in the range of nA or pA for a small signal Si diode at ambient temperature.

16. The apparatus according to claim 10, wherein the apparatus implements an improved method, which is sensitive to increasing serial resistance, resulting in the following equations 16 and 17:

$$\Delta V_1 = T \cdot k/q \cdot \ln(I_1/I_0) + a_1(T) \cdot (1 - I/I_0)/(1 + [I/I_0]^{a_2(T)} + Rs \cdot (I_1 - I_0)) \quad [16a]$$

$$\Delta V_{n-1} = T \cdot k/q \cdot \ln(I_{n-1}/I_0) + a_1(T) \cdot (1 - I_{n-1}/I_0)/(1 + [I_{n-1}/I_0]^{a_2(T)}) + Rs \cdot (I_1 - I_0) \quad [16b]$$

or $$\Delta V_1 = T \cdot k/q \cdot \ln(r_1) + a_1(T) \cdot (1 - r_1)/(1 + [r_1]^{a_2(T)}) + Rs \cdot (r_1 - 1) \cdot I_0 \quad [17a]$$

$$\Delta V_{n-1} = T \cdot k/q \cdot \ln(r_{n-1}) + a_1(T) \cdot (1 - r_{n-1})/(1 + [r_{n-1}]^{a_2}(T)) + Rs \cdot (r_{n-1} - 1) \cdot I_0, n \geq 5 \quad [17b]$$

wherein $a_1(T)$ and $a_2(T)$ are parameters for the description of high current characteristic behavior and $I_0$ is a constant reference current.

17. The apparatus according to claim 10, wherein the apparatus implements a serial resistance $R_s$ of a proper PN-junction model, which takes into account the aging of the diode-based temperature sensor, in that the response of two equivalent PN-junctions of a same die but with divergent electrical usage are composed, wherein a record with the significant model parameters is kept for each diode sensor, and wherein this record dictates the "end of life" of the sensing PN-junction and at least the temperature and a model parameter history is kept in non-volatile memory selected from the group consisting of NVRAM, EEPROM and Flash, by increasing the recording rate for an increasing PN-junction behaviour drift.

18. The apparatus according to claim 10, wherein the apparatus implements an auto-calibration, wherein a ratio between two current source banks are using an internal resistor, in such a way that the maximum level for the lower energy bank and the lowest level for the higher energy bank can fit in an A/D converter range, wherein the resistor is selected from an internal bank of resistors, wherein the resistivity of said resistor is stable inside the adopted IC technology typical working temperature range and wherein the current density is not as high to heat the integrated thin-film resistor beyond that upper limit, preferably a polysilicon resistor in CMOS-technology is implemented.

19. The apparatus according to claim 1, wherein the number of switches being connected to the sink diode and the PN-junction thermal sensor consists of an odd number of three or more.

20. The apparatus according to claim 10, wherein the number of switches being connected to the sink diode and the PN-junction thermal sensor consists of an odd number of three or more.

* * * * *